Patented Dec. 2, 1941

2,264,372

UNITED STATES PATENT OFFICE 2,264,372

COMPOSITION OF MATTER AND METHODS AND STEPS OF MAKING AND USING THE SAME

Mortimer T. Harvey, East Orange, N. J., assignor to The Harvel Corporation, a corporation of New Jersey No Drawing. Application May 26, 1939, Serial No. 275,901

13 Claims. (Cl. 167—24)

The present invention relates to insecticidal solutions in which insecticidal rotenone products serve as the effective insecticide, petroleum oil is used as the diluent and carrier, and phenols of the Anacardiaceae family which are soluble in petroleum oils and which will dissolve the rotenone products serve to hold the latter in solution in the petroleum oils.

The phenols suitable for use in the practice of the present invention are phenols having long hydrocarbon side-chain substituents on the nucleus thereof. Some of these long hydrocarbon side-chain substituent phenols are found to be naturally occurring in the juices of plants of the Anacardiaceae family. Examples of these, defined phenols are cashew nut shell liquid; marking nut shell liquid; the juice of the Japanese lac plant; the naturally occurring phenolic constituents of cashew nut shell liquid, or marking nut shell liquid and of the juice of the Japanese lac plant, for example, anacardic acid, cardol, anacardol, urushiol, and other long hydrocarbon side-chain substituted phenols found in these juices. Further examples are phenols and other compounds which are derivatives of the above defined phenols, that is for example: cardanol; any of the above defined phenols which has been modified by hydrogenation to satisfy the unsaturated bond of the long hydrocarbon side-chain, including hydrogenated cardanol; acid treated cashew nut shell liquid; slightly polymerized cashew nut shell liquid; acetic acid derivatives of any of the above phenols such as cardanoxy acetic acid; acetates of any of the above phenols.

Generally, phenols suitable for use in the practice of the present invention are phenols having hydrocarbon side-chains of from about ten to twenty carbon atoms on the phenol nucleus.

The cashew nut shell liquid suitable for use in the practice of the present invention is that removed from the cashew nut shell by cold pressing, by heating at small degree of elevation of temperature or at high elevation, or by extraction with a solvent. Before being made up into an insecticidal solution with a rotenone product, the cashew nut shell liquid can be treated to remove naturally occurring metals by a method such as is described in Patent Number 2,067,919.

Cardanol is a phenol having a hydrocarbon chain of about fourteen carbon atoms on the nucleus, with an unsaturated group in said chain, and is described in my Patent No. 2,098,824. The molecular weight is about 288.

Examples of the rotenone bearing materials suitable for use in the practice of the present invention, are derris root extract, derris resinate, barbasco, cube, timbo, and other effective insecticidal forms of rotenone, and also chemically or technically pure rotenone.

Examples of the petroleum oils suitable for use in the practice of the present invention are kerosene, gasoline, fuel oil, petroleum (petroleum jellies), and regular spray oils, for example those having viscosity of from about 70 to about 95 Saybolt.

Example 1

One part by weight of derris root extract is dissolved in twenty parts of cardanol and this solution is dissolved in four hundred parts of kerosene. This gives a clear solution adapted for application by spraying and otherwise.

Example 2

A solution similar to that of Example 1 above is made up, but using cashew nut shell liquid instead of cardanol.

Either the raw or commercial cashew nut shell liquid or cashew nut shell liquid from which naturally occurring salts have been removed can be used.

Example 3

Marking nut shell liquid is substituted for the cardanol of Example 1.

Example 4

Urushiol, from the Japanese lac plant, can be substituted in Eexample 1 for the cardanol.

The proportions of the ingredients in the above examples are merely illustrative and are not limiting because the rotenone products and the petroleum oils are soluble in the Anacardiaceae phenols in proportions over considerable ranges, and variations in proportions can be made to suit the particular purpose to which the insecticide is to be applied and to suit the method of applying.

The rotenone-petroleum-phenol solutions of the present invention can be applied by mixing with water and spraying and can be applied in various other ways known in the art for applying liquid insecticides.

General example

The other phenols named above can be used in the same or in a similar method to that given in Example 1 for the preparation and use of the phenol, all of them generally and hydrogenated cardanol and the acid treated cashew nut shell liquid of Example 4 when hydrogenated, in particular. Also mixture of two or more of the phenols above cited can be used to suit particular cases.

Certain dilutions of rotenone in petroleum oils, by means of Anacardiaceae phenols, are given above but limitations thereof are not made within the limits of solubility for different ingredients of the general kinds named and for various proportions used to suit a great variety.

The rotenone-Anacardiaceae phenol-petroleum oil compositions above described and exemplified are suitable for use and application either with or without water. When used with water they are made into a finely divided emulsion.

Also, the Anacardiaceae phenol-petroleum oil solution of the present invention can be used to extract the insecticidal rotenone material from their sources, whatever the latter are. For example, derris root (or other root) can be comminuted and put into a cashew nut shell liquid-kerosene solution, with or without heating, to dissolve the insecticidal rotenone product after which the solution is filtered from the comminuted solids and the filtered solution can be used as such as an insecticide or it can be made up by the addition of further amounts of petroleum oil.

Further, any of the Anacardiaceae phenols which are in liquid state, either hot or cold, can be used, without the kerosene or other petroleum oil, for extracting the insecticidal rotenone product by solution of the latter, with or without heating, and then preferably filtered from the comminuted solids. Illustrative examples are cashew nut shell liquid, cashew nut shell liquid polymer in the liquid state and cardanol. The Anacardiaceae phenol-rotenone solution can be sold as such for dilution, as for example with kerosene, or it can be as an insecticide without solvent dilution in which case it could be used and applied as such or used with water for spray distribution, for example.

Having thus described my invention, what I claim and desire to protect by Letters Patent is:

1. In an insecticide, in combination, an insecticidal rotenone product, a petroleum oil and a phenol derived from the Anacardiaceae family of plants and having on its nucleus a long hydrocarbon chain substituent characteristic of an Anacardiaceae phenol, which said phenol is a common solvent for said rotenone product and said petroleum oil.

2. In an insecticide, in combination, an insecticidal rotenone product, a petroleum oil and a phenol derived from cashew nut shell liquid and having on its nucleus a long hydrocarbon chain substituent characteristic of a cashew nut shell liquid phenol, which said phenol is a common solvent for said rotenone product and said petroleum oil.

3. In an insecticide, in combination, an insecticidal rotenone product, a petroleum oil and a phenol selected from the group consisting of cashew nut shell liquid and phenols derived from cashew nut shell liquid and having a long hydrocarbon chain substituent characteristic of a cashew nut shell liquid phenol, which said phenol is a common solvent for said rotenone product and said petroleum oil.

4. In an insecticide, in combination, an insecticidal rotenone product, a petroleum oil and cashew nut shell liquid.

5. In an insecticide, in combination, an insecticidal rotenone product, a petroleum oil and a liquid phenol which is polymerized cashew nut shell liquid and which is a common solvent for said rotenone product and said petroleum oil.

6. In an insecticide, in combination, an insecticidal rotenone product, a petroleum oil and cardanol.

7. In an insecticide, in combination, an insecticidal rotenone product, kerosene, and a phenol derived from the Anacardiaceae family of plants and having on its nucleus a long hydrocarbon chain substituent characteristic of an Anacardiaceae phenol, which said phenol is a common solvent for said rotenone product and of said kerosene and which has an unsaturated hydrocarbon radicle on the nucleus thereof.

8. An insecticide comprising a solution of an insecticidal rotenone product in a phenol derived from a plant of the Anacardiaceae family and having on its nucleus a long hydrocarbon chain substituent characteristic of an Anacardiaceae phenol.

9. The method of making an insecticidal solution which comprises extracting an insecticidal rotenone bearing source with a solvent phenol derived from a plant of the Anacardiaceae family and having on its nucleus a long hydrocarbon chain substituent characteristic of an Anacardiaceae phenol.

10. The method of making an insecticide which comprises dissolving an insecticidal rotenone product with a phenol in the liquid state, which phenol is derived from cashew nut shell liquid and is a solvent for said insecticidal rotenone product and has on its nucleus a long hydrocarbon substituent characteristic of a cashew nut shell liquid phenol.

11. An insecticidal solution comprising an insecticidal rotenone product and a phenol, having on the nucleus thereof from ten to about twenty carbon atoms in the form of a hydrocarbon side chain substituent, said phenol being a solvent for said extracted insecticide and a solvent for a petroleum oil.

12. An insecticidal solution comprising an insecticidal rotenone product dissolved in a phenol having a characteristic hydrocarbon side chain of phenols selected from the group consisting of cardol and anacardic acid.

13. An insecticidal solution comprising an insecticidal rotenone product, a petroleum oil and a phenol, having on the nucleus thereof from ten to about twenty carbon atoms in the form of a hydrocarbon side chain substituent, said phenol being a solvent for said extracted insecticide and a solvent for said petroleum oil.

MORTIMER T. HARVEY.